US012265611B2

(12) United States Patent
Shachar et al.

(10) Patent No.: US 12,265,611 B2
(45) Date of Patent: Apr. 1, 2025

(54) SYSTEM AND METHOD FOR MONITORING AND DETECTING OF ENCRYPTION BASED THREATS

(71) Applicant: Dell Products L.P., Round Rock, TX (US)

(72) Inventors: Tomer Shachar, Omer (IL); Maxim Balin, Gan Yavne (IL); Yevgeni Gehtman, Modi'in (IL)

(73) Assignee: Dell Products L.P., Round Rock, TX (US)

( * ) Notice: Subject to any disclaimer, the term of this patent is extended or adjusted under 35 U.S.C. 154(b) by 564 days.

(21) Appl. No.: 17/539,592

(22) Filed: Dec. 1, 2021

(65) Prior Publication Data
US 2023/0169166 A1    Jun. 1, 2023

(51) Int. Cl.
*G06F 21/55*    (2013.01)
*G06N 5/04*    (2023.01)

(52) U.S. Cl.
CPC ............. *G06F 21/554* (2013.01); *G06N 5/04* (2013.01); *G06F 2221/034* (2013.01)

(58) Field of Classification Search
CPC ............. G06F 21/554; G06F 2221/034; H04L 63/1416; H04L 63/145
See application file for complete search history.

(56) References Cited

U.S. PATENT DOCUMENTS

| 5,961,651 | A | * | 10/1999 | Gittins | G06F 9/542 709/200 |
| 7,409,718 | B1 | * | 8/2008 | Hong | G06F 21/563 726/24 |
| 9,514,309 | B1 | * | 12/2016 | Mann | G06F 21/567 |
| 9,860,257 | B1 | * | 1/2018 | Kumar | G06F 11/3006 |

(Continued)

OTHER PUBLICATIONS

A. Singh, M. A. Ali, B. Balamurugan and V. Sharma, "Blockchain: Tool for Controlling Ransomware through Pre-Encryption and Post-Encryption Behavior," 2022 Fifth International Conference on Computational Intelligence and Communication Technologies (CCICT), Sonepat, India, 2022, pp. 584-589. (Year: 2022).*

(Continued)

*Primary Examiner* — Kari L Schmidt
(74) *Attorney, Agent, or Firm* — WOMBLE BOND DICKINSON (US) LLP

(57) ABSTRACT

Methods and systems for managing the operation of data processing systems are disclosed. The data processing systems may provide computer implemented services to any type and number of other devices and/or users of the data processing systems. To improve the likelihood of the data processing systems being able to provide the computer implemented services, a system may proactively attempt to identify and remediate attempts to limit access to data stored in the data processing systems. To do so, multiple layers of monitoring may be deployed to the data processing systems. A first deployed layer of monitoring may identify information regarding encryption types and/or characteristics of (Continued)

encryption being performed. A second deployed layer of monitoring may identify telemetry for storage devices on which data subject to encryption is deployed. The information collected via theses layers may be used to infer whether any encryption being performed is authorized or unauthorized.

20 Claims, 7 Drawing Sheets

(56) References Cited

U.S. PATENT DOCUMENTS

| | | | |
|---|---|---|---|
| 9,990,511 B1* | 6/2018 | Dreyfus | G06F 3/0619 |
| 11,792,223 B2* | 10/2023 | Varshney | G06F 21/566 |
| | | | 726/23 |
| 11,954,337 B2* | 4/2024 | Burugula | G06F 21/568 |
| 12,001,797 B2* | 6/2024 | Orbach | G06F 40/289 |
| 12,086,250 B1* | 9/2024 | Brandwine | G06F 21/566 |
| 12,192,214 B2* | 1/2025 | Cosgrove | H04L 63/1408 |
| 12,197,578 B1* | 1/2025 | Brandwine | G06F 21/554 |
| 2002/0173857 A1* | 11/2002 | Pabari | H04L 67/535 |
| | | | 700/1 |
| 2007/0294756 A1* | 12/2007 | Fetik | G06F 21/552 |
| | | | 726/11 |
| 2008/0243979 A1* | 10/2008 | Cherkauer | G06F 21/606 |
| | | | 708/303 |
| 2010/0005151 A1* | 1/2010 | Gokhale | G06F 16/2272 |
| | | | 709/216 |
| 2010/0332479 A1* | 12/2010 | Prahlad | G06Q 30/0206 |
| | | | 707/661 |
| 2013/0024626 A1* | 1/2013 | Benhase | G06F 11/1446 |
| | | | 711/137 |
| 2013/0139247 A1* | 5/2013 | Cianfrocca | H04L 63/02 |
| | | | 726/14 |
| 2016/0019271 A1* | 1/2016 | Ma | G06F 16/955 |
| | | | 707/756 |
| 2016/0034481 A1* | 2/2016 | Kumarasamy | G06F 16/128 |
| | | | 707/639 |
| 2016/0055101 A1* | 2/2016 | Gerhart | H04L 9/0894 |
| | | | 713/193 |
| 2017/0093886 A1* | 3/2017 | Ovcharik | H04L 9/002 |
| 2018/0101678 A1* | 4/2018 | Rosa | G06F 3/0622 |
| 2018/0139053 A1* | 5/2018 | Kadam | G06F 3/0622 |
| 2018/0198800 A1* | 7/2018 | Krasser | H04L 63/1416 |
| 2018/0349489 A1* | 12/2018 | Toudji | G06F 16/313 |
| 2019/0005235 A1* | 1/2019 | Klonowski | G06F 21/6218 |
| 2019/0109869 A1* | 4/2019 | Bailey | H04L 63/1425 |
| 2019/0158512 A1* | 5/2019 | Zhang | H04L 63/1416 |
| 2019/0347418 A1* | 11/2019 | Strogov | G06F 21/44 |
| 2020/0026397 A1* | 1/2020 | Wohlstadter | G06F 3/0482 |
| 2020/0050760 A1* | 2/2020 | El-Moussa | H04L 63/145 |
| 2020/0065485 A1* | 2/2020 | Pandey | G06F 16/178 |
| 2020/0210577 A1* | 7/2020 | Chistyakov | G06F 21/566 |
| 2021/0026961 A1* | 1/2021 | Underwood | G06F 21/566 |
| 2021/0044603 A1* | 2/2021 | Annen | G06N 20/00 |
| 2021/0044604 A1* | 2/2021 | Annen | G06F 21/565 |
| 2021/0373977 A1* | 12/2021 | Javeed | G06F 18/2433 |
| 2021/0397519 A1* | 12/2021 | Wilcock | G06F 11/1451 |
| 2022/0027471 A1* | 1/2022 | Levy | G06F 21/6218 |
| 2022/0141201 A1* | 5/2022 | Lal | H04L 63/1475 |
| 2022/0245245 A1* | 8/2022 | Annen | G06N 20/00 |
| 2022/0292196 A1* | 9/2022 | Bhagi | G06N 20/00 |
| 2022/0321551 A1* | 10/2022 | Mack | H04L 9/3226 |
| 2022/0374519 A1* | 11/2022 | Botelho | G06F 11/1464 |
| 2023/0060606 A1* | 3/2023 | Dubey | G06F 11/076 |
| 2023/0107335 A1* | 4/2023 | Garyani | H04L 63/1416 |
| | | | 726/23 |
| 2023/0109510 A1* | 4/2023 | Polimera | G06F 11/1458 |
| | | | 714/6.3 |
| 2023/0120174 A1* | 4/2023 | Seck | G06F 21/566 |
| | | | 726/25 |
| 2023/0306108 A1* | 9/2023 | Veprinsky | G06F 21/552 |
| 2023/0367876 A1* | 11/2023 | Algieri | G06F 21/561 |
| 2024/0273190 A1* | 8/2024 | Shachar | G06F 21/566 |

OTHER PUBLICATIONS

Routa Moussaileb, Nora Cuppens, Jean-Louis Lanet, and Helene Le Bouder. 2021. A Survey on Windows-based Ransomware Taxonomy and Detection Mechanisms. ACM Comput. Surv. 54, 6, Article 117 (Jul. 2022) (Year: 2022).*

S. Dara, "Network Telemetry Anonymization for Cloud Based Security Analysis—Best Practices," 2014 IEEE International Conference on Cloud Computing in Emerging Markets (CCEM), Bangalore, India, 2014, pp. 1-7. (Year: 2014).*

D. Y. Huang et al., "Tracking Ransomware End-to-end," 2018 IEEE Symposium on Security and Privacy (SP), San Francisco, CA, USA, 2018, pp. 618-631. (Year: 2018).*

* cited by examiner

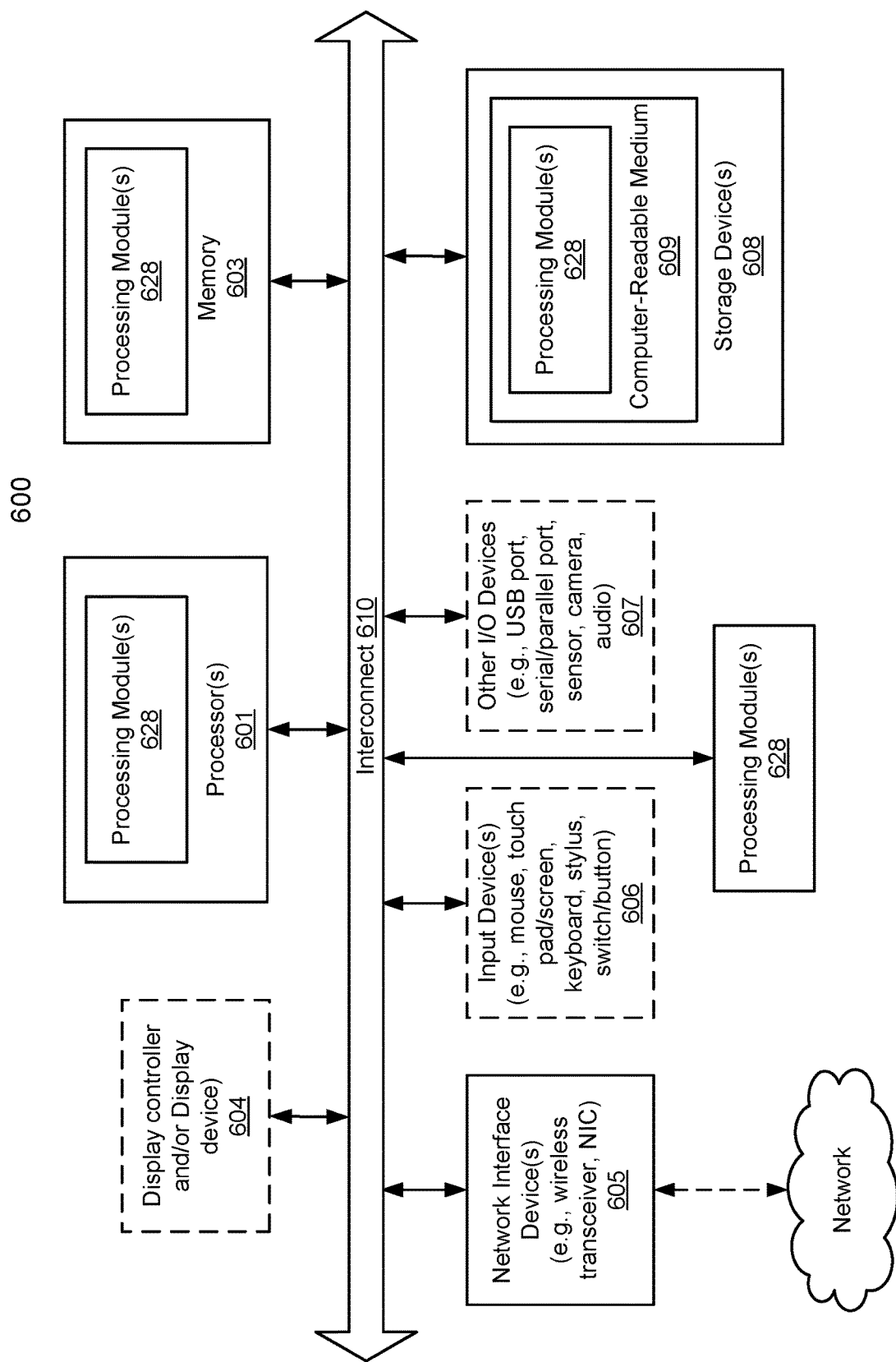

SYSTEM AND METHOD FOR MONITORING AND DETECTING OF ENCRYPTION BASED THREATS

FIELD OF THE DISCLOSURE

Embodiments relate generally to managing device operation. More particularly, embodiments relate to systems and methods to manage the operation of devices that may be subject to malicious activity.

BACKGROUND

Computing devices may store data and used stored data. For example, computing devices may utilize data when providing computer implemented services. If computing devices are unable to access data, the computing devices may be unable to provide some, or all, of the computer implemented services that the computing devices are able to provide with access to data.

BRIEF DESCRIPTION OF THE DRAWINGS

Embodiments are illustrated by way of example and not limitation in the figures of the accompanying drawings in which like references indicate similar elements.

FIG. 6 shows a block diagram illustrating a computing device in accordance with an embodiment.

DETAILED DESCRIPTION

Figure 1:
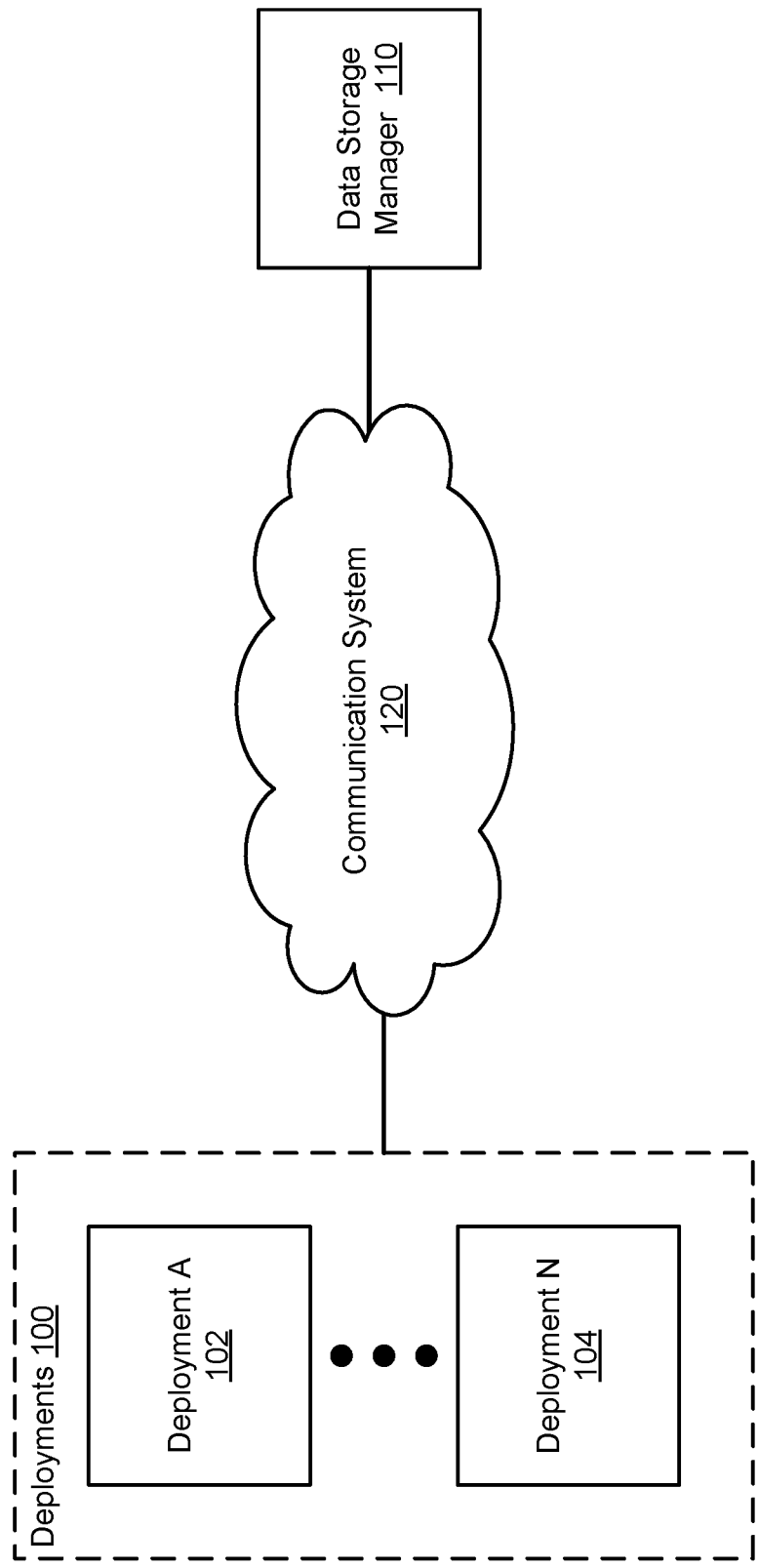
FIG. 1 shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing the operation of data processing systems. The data processing systems may provide computer implemented services to any type and number of other devices and/or users of the data processing systems.

The data processing systems may be a part of a distributed system. As part of the distributed system, the data processing systems may be exposed to malicious parties that may attempt to influence the operation of the data processing system in an undesirable manner. For example, the malicious parties may attempt to limit access to and/or make copies of data stored by the data processing systems. The malicious parties may do so by encrypting portions of data using an encryption key. Consequently, access to the encrypted data may be limited unless the encryption key (or other type of decryption data) is available, which may be kept secret by the malicious parties. Once the data is rendered inaccessible via the encryption, the data processing systems may be unable to or may be limited in their ability to provide the computer implemented services.

To improve the likelihood of the data processing systems being able to provide the computer implemented services, a system in accordance with embodiment may proactively attempt to identify and remediate attempts to limit access to data (e.g., necessary for performance of all, or a portion, of the computer implemented services). To do so, multiple layers of monitoring may be deployed to the data processing systems. A first deployed layer of monitoring may identify information regarding encryption types and/or characteristics of encryption being performed. A second deployed layer of monitoring may identify telemetry for storage devices on which data subject to encryption is deployed. The information collected via theses layers may be used to infer whether any encryption being performed is authorized or unauthorized (e.g., a malicious activity).

If an encryption is determined as being unauthorized, then an action set may be performed to remediate risk associated with the encryption. The actions set may include, for example, notifying administrators and/or taking other actions that may limit the extent of the impact of the unauthorized encryption on a data processing system.

In this manner, an embodiment disclosed herein may improve the uptime of computer implemented services in a distributed system and reduce a cognitive burden on administrators of the distributed system for management purposes, as well as providing other advantages.

In an embodiment, a computer-implemented method for managing malicious activity in a data processing system is provided. The method may include identifying an encryption event associated with storage of the data processing system, the encryption event even being associated with a change in encryption state of a portion of data stored in the storage; performing type classification for an encryption associated with the encryption event; collecting telemetry from one or more computing components of the data processing system, the one or more computing components being impacted by the encryption; making a determination that the encryption is not authorized based on the type classification and/or the telemetry; and performing an action set to remediate risk associated with the encryption event, the action set being based, at least in part, on the determination.

Making the determination may include comparing the type classification to a list of allowed type classifications; when the type classification matches an entry of the list of allowed type classifications, making a second determination that the encryption may be authorized; and when the type classification does not match any entry of the list of allowed type classifications: making the second determination that the encryption is not authorized, the determination being based, at least in part, on the second determination.

Making the second determination may include using the telemetry as input to an inference model, the inference model outputting a prediction regarding whether the encryption is authorized based on the input; when the prediction indicates that the encryption is authorized, making a third determination that the encryption may be authorized; when the prediction indicates that the encryption is not authorized, making the third determination that the encryption is not authorized, the determination being further based, at least in part, on the third determination.

Making the determination may include driving an inference model with the telemetry to obtain a prediction of whether the encryption is authorized. The inference model may be based on training telemetry obtained from the one or more computing components prior to when the telemetry is obtained.

The inference model may be an anomaly detection model. The anomaly detection model may detect anomalies in the operation of a storage device while an encryption is performed.

The training telemetry may include first information regarding operation of a storage system of the data processing system during a second encryption event that is associated with a second encryption that is known to be unauthorized. The training telemetry may also include second information regarding operation of a storage system of the data processing system during a third encryption event that is associated with a third encryption that is known to be authorized.

The inference model may include a machine learning model trained using the training telemetry.

The inference model may include a number of thresholds, each of the number of thresholds indicating that the encryption is not authorized when the telemetry exceeds at least one of the number of thresholds.

The telemetry may include a list of processes hosted by the data processing system; a list of data structures that are hosted by the data processing system and have been accessed as part of the encryption; a list of names of the data structures; a list of input-output of storage system events for the data processing system while the encryption is ongoing; a list of accesses of organizational data structures that organize data stored by the data processing system while the encryption is ongoing; and a list of any multi-encryption events while the encryption is ongoing.

The telemetry may be used to identify an encryption characteristic, the encryption characteristic may include at least one selected from a group consisting of: a block cipher used by the encryption; a block length used by the encryption; a level of entropy of output of the encryption; an encryption scheme employed by the encryption; and a level of recurrence of the encryption.

The action set may include suspending execution of an entity associated with the encryption; and reverting one or more changes to application data hosted by the data processing system.

A non-transitory media may include instructions that when executed by a processor cause the computer-implemented method to be performed.

A system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide any type and quantity of computer implemented services. The system may include, but is not limited to, one or more deployments 100 operably connected to a data storage manager 110. Each of these components is discussed below.

All, or a portion, of deployments 102-104 may provide computer implemented services to users and/or other computing devices operably connected to the deployments 100. The computer implemented services may include any type and quantity of services including, for example, database services, instant messaging services, video conferencing services, etc. To provide these services, deployments 100 may host applications that provide these (and/or other) computer implemented services. When providing the computer implemented services, deployments 100 may store various portions of data (e.g., in local storage) and retrieve various portions of stored data.

The computer implemented services may presume that data may be stored for future use and stored data may be retrieved for use in the future. If such capabilities are not available, then deployments 100 may not be capable of providing the computer implemented services.

For example, consider a scenario where a deployment is providing database services. To provide the database services, the deployment may obtain data from a client (not shown) and store the data in a locally maintained data repository. In the future, the deployment may retrieve the data from the data repository to service future data access requests (e.g., read/writes) for the data.

To provide the computer implemented services to other entities, deployments 100 may be operably connected to any number of such devices such that the deployments may communicate. Deployments 100 may use the operable connections to send and/or receive data to/from the other devices.

However, as disclosed herein, it has been found that the operable connections and/or other attack vectors may allow for malicious parties to attempt to compromise the operation of one or more of deployments 100. For example, the malicious parties may attempt to distribute malware, ransomware, and/or other types of entities (e.g., "malicious entities") to deployments 100. If so distributed, the malicious entities may attempt (and/or succeed at) modifying the operation of one or more of the deployments from a nominal operation. In some cases, remote malicious entities may utilize functionality of non-malicious entities hosted by deployments 100 to cause malicious activities to be performed by deployments 100.

The changes from nominal operation of deployments 100 may include, for example: (i) encrypting portions of data stored in deployments 100 using a key unknown to users of the now-encrypted data, (ii) distributing portions of data stored in deployments 100 that would otherwise not be available to the entities to which the portions of data are distributed, (iii) scramble or otherwise reorganize stored data (e.g., by modifying/deleting metadata) such that the now-scrambled data may not be interpretable by the deployments in a manner that allows the information content of the data to be extracted through read operations, and/or (iv) other actions that may impair the ability of deployments 100 to provide desired computer implemented services.

The divergence of the operation of deployments 100, by virtue of the malicious entities, may prevent and/or reduce the capability of deployments 100 providing computer implemented services. In general, embodiments disclosed herein provide methods, systems, and devices for improving the likelihood of deployments providing computer implemented services. To do so, a system in accordance with an embodiment may proactively monitor for signs of malicious activities. If malicious activities are identified, one or more actions to remediate risk associated with the malicious activities may be performed. The actions may include, for example, suspending the operation of one or more entities associated with the malicious activities, reverting modifications to data impacted by the malicious activities, and/or any other types of actions that may be used to reduce the impact of malicious activities on a deployment.

In an embodiment, the malicious activities include encrypting of data. However, deployments 100 may perform data encryption for non-malicious activities. To discriminate malicious encryption (e.g., that may need to be remediated) from non-malicious encryption, a system in accordance with an embodiment may include multiple layers of monitoring and detection. These layers may take into account various types of authorized encryption used for authorized, non-malicious activities and telemetry regarding the operation of one or more storages. The aforementioned information may be used to identify only those encryption activities that are likely to be malicious. Consequently, a system in accordance with an embodiment disclosed herein may be able to proactively remediate malicious encryption activities while allowing authorized encryption activities to be performed without impeding them.

Deployments 100 may be implemented with one or more data processing systems. A data processing system may include one or more computing devices. Any of deployments (e.g., 102, 104) may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 6. For additional details regarding deployments 100, refer to FIG. 2A.

To facilitate monitoring for and detection of malicious activities, the system of FIG. 1 may include data storage manager 110. Data storage manager 110 may selectively monitor deployments 100 for malicious activities and remediate them if any such malicious activities are detected.

In an embodiment, data storage manager 110 performs its functionality selectively thereby limiting the impact (e.g., computational overhead) on the operation of deployments 100. To do so, data storage manager 110 may selectively implement one or more layers on one or more of deployments 100. A first layer may be implemented at a management entity (e.g., operating system) level. The first layer may provide for high level screening to identify when encryption activities are being performed and whether the encryption activities are expected.

A second layer may be implemented at a storage device level. The second layer may provide for telemetry collection and use of the collected telemetry to infer whether an encryption activity (e.g., identified by the first layer) is likely to be malicious or authorized. Consequently, the second layer may provide its function only when the first layer identifies that an encryption activity is being performed. Consequently, the overhead for telemetry collection may be limited.

Data storage manager 110 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 6. For additional details Data storage manager 110, refer to FIG. 2B.

In an embodiment, one or more of deployments 100 and data storage manager 110 are operably connected via communication system 120. Communication system 120 may allow any of deployments 100 and data storage manager 110 to communication with one another (and/or with other devices not illustrated in FIG. 1). To provide its functionality, communication system 120 may be implemented with one or more wired and/or wireless networks. Any of these networks may be private, public, and/or may include the Internet. For example, deployments 100 may be operably connected to one another via a local network which is operably connected to the Internet. Similarly, data storage manager 110 may be operably connected to one another via a second local network which is also operably connected to the Internet thereby allowing any of deployments 100 and data storage manager 110 to communication with one another and/or other devices operably connected to the Internet. Deployments 100, data storage manager 110, and/or communication system 120 may be adapted to perform one or more protocols for communicating via communication system 120.

While illustrated in FIG. 1 with a limited number of specific components, a system may include additional, fewer, and/or different components without departing from embodiments disclosed herein.

Figure 2A:
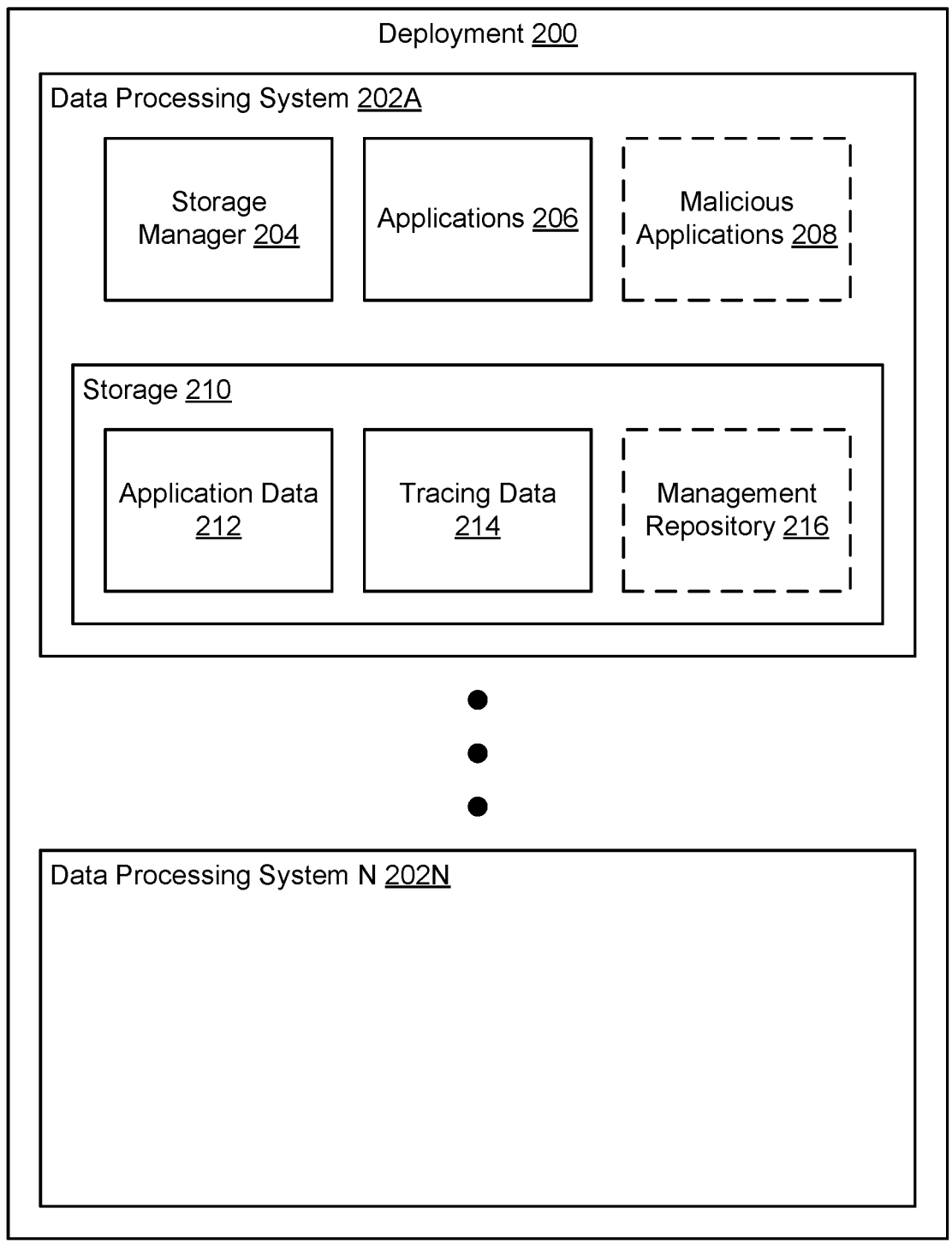
FIG. 2A shows a block diagram illustrating a data processing system in accordance with an embodiment.

Turning to FIG. 2A, a diagram of an example deployment 200 in accordance with an embodiment is shown. Deployment 200 may be similar to any of deployments 100.

Deployment 200 may provide computer implemented services to various client devices (not shown). Additionally, deployment 200 may perform malicious activity detection, monitoring, and/or remediation services in isolation and/or cooperation with data storage manager 110.

To provide the aforementioned functionality, Deployment 200 may include any number of data processing systems 202A-202N. Any of the data processing systems may be implemented using a computing devices. Any of data processing systems 202A-202N may include a storage manager 204, one or more applications 206, one or more malicious applications 208 (drawn with dashed outline to indicate that it may not be present and/or may only be present during certain periods of time, and/or to indicate that it may not be present but other components may perform its functionality), and storage 210. Each of these components is discussed below.

Storage manager 204 may mediate presentation of storage 210 to applications 206 and/or other entities (e.g., malicious applications 208) hosted by a host data processing device. For example, storage manager 204 may be implemented as a configurable storage operating system that may, for example, manage servicing of data access requests (e.g., requests to store data and/or retrieve copies of stored data from storage 210).

In an embodiment, storage manager 204 also facilitates minoring, detection, and/or remediation of malicious activity on a host data processing device. To do so, storage manager 204 may cooperate with data storage manager 110 to monitor, detect, and/or remediate the malicious activity.

For example, data storage manager 110 may monitor various types of encryption activities being performed, when encryption activities are being performed monitor telemetry (e.g., stored as part of tracing data 214) for one or more devices of storage 210 (and/or other components of a host data processing system), provide information regarding the encryption and/or telemetry to the data storage manager 110, generate and/or obtain inferences (e.g., whether authorized or unauthorized) regarding encryption activity, and/or perform one or more actions when it is determined that an unauthorized encryption has and/or is being performed.

Applications 206 may be the computer implemented services. When doing so, the applications may store and/or retrieve copes of stored application data 212 in storage 210. Consequently, the operation of applications 206 may be predicated on the accessibility of application data 212.

Malicious applications 208 may perform one or more malicious activities, such as attempting to encrypt portions of application data 212. The malicious applications 208 may be, for example, malware, ransomware, and/or other types of malicious entities. In some embodiments, malicious applications 208 may be remote to a host data processing system but may influence the operation of one or more of applications 206 and/or other entities hosted by a data processing system such that the function of malicious applications 208 is performed by a data processing system.

In an embodiment, storage manager 204, one or more of applications 206, and/or one or more of malicious applications 208 is implemented using a hardware device including circuitry. The hardware device may be, for example, a digital signal processor, a field programmable gate array, or an application specific integrated circuit. The circuitry may be adapted to cause the hardware device to perform the functionality of storage manager 204, one or more of applications 206, and/or one or more of malicious applications 208. Storage manager 204, one or more of applications 206, and/or one or more of malicious applications 208 may be implemented using other types of hardware devices without departing embodiment disclosed herein.

In one embodiment, storage manager 204, one or more of applications 206, and/or one or more of malicious applications 208 is implemented using a processor adapted to execute computing code stored on a persistent storage that when executed by the processor performs the functionality of storage manager 204, one or more of applications 206, and/or one or more of malicious applications 208 discussed throughout this application. The processor may be a hardware processor including circuitry such as, for example, a central processing unit, a processing core, or a microcontroller. The processor may be other types of hardware devices for processing information without departing embodiment disclosed herein.

Figure 3:
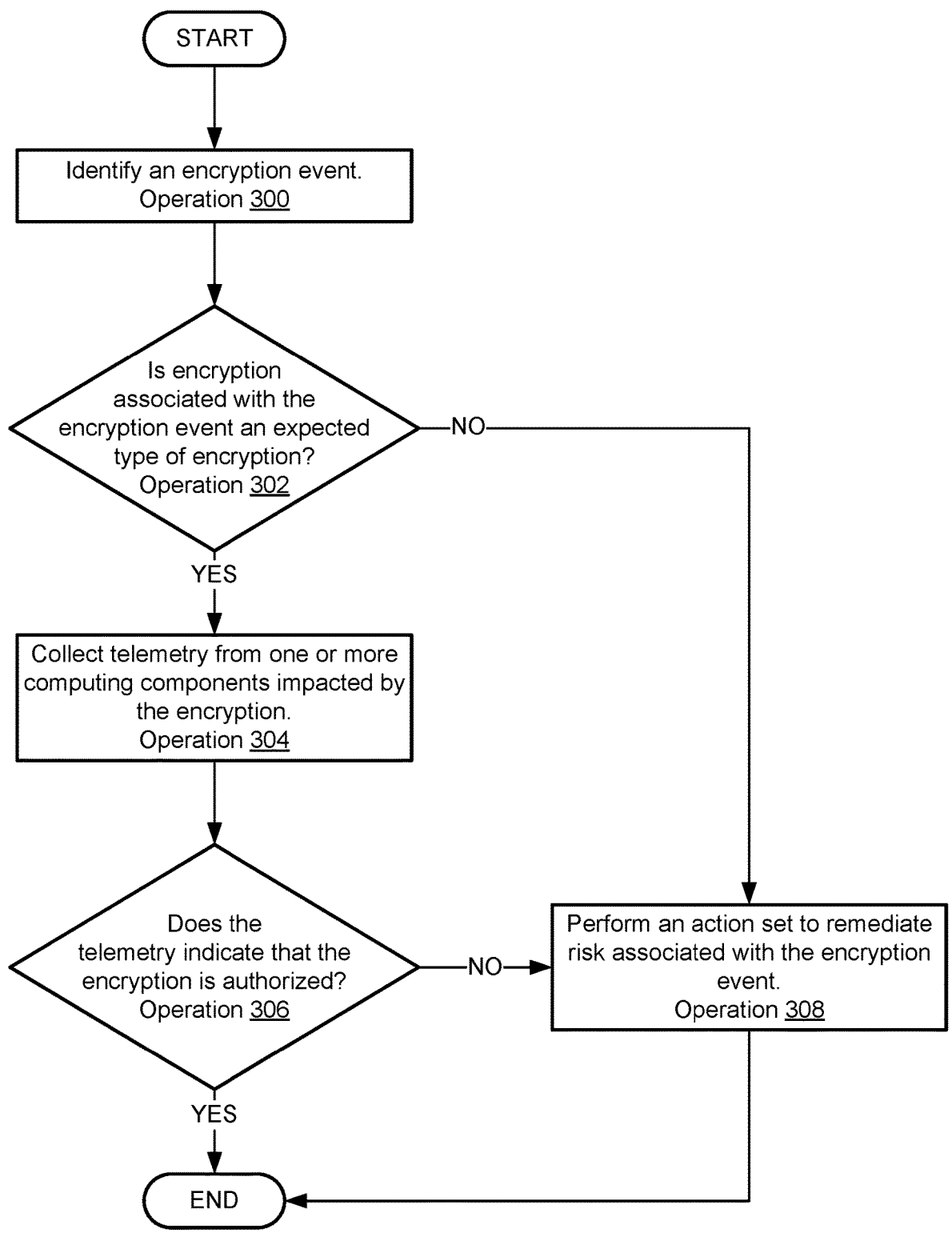
FIG. 3 shows a flow diagram illustrating a method of managing encryption in accordance with an embodiment.
Figure 4:
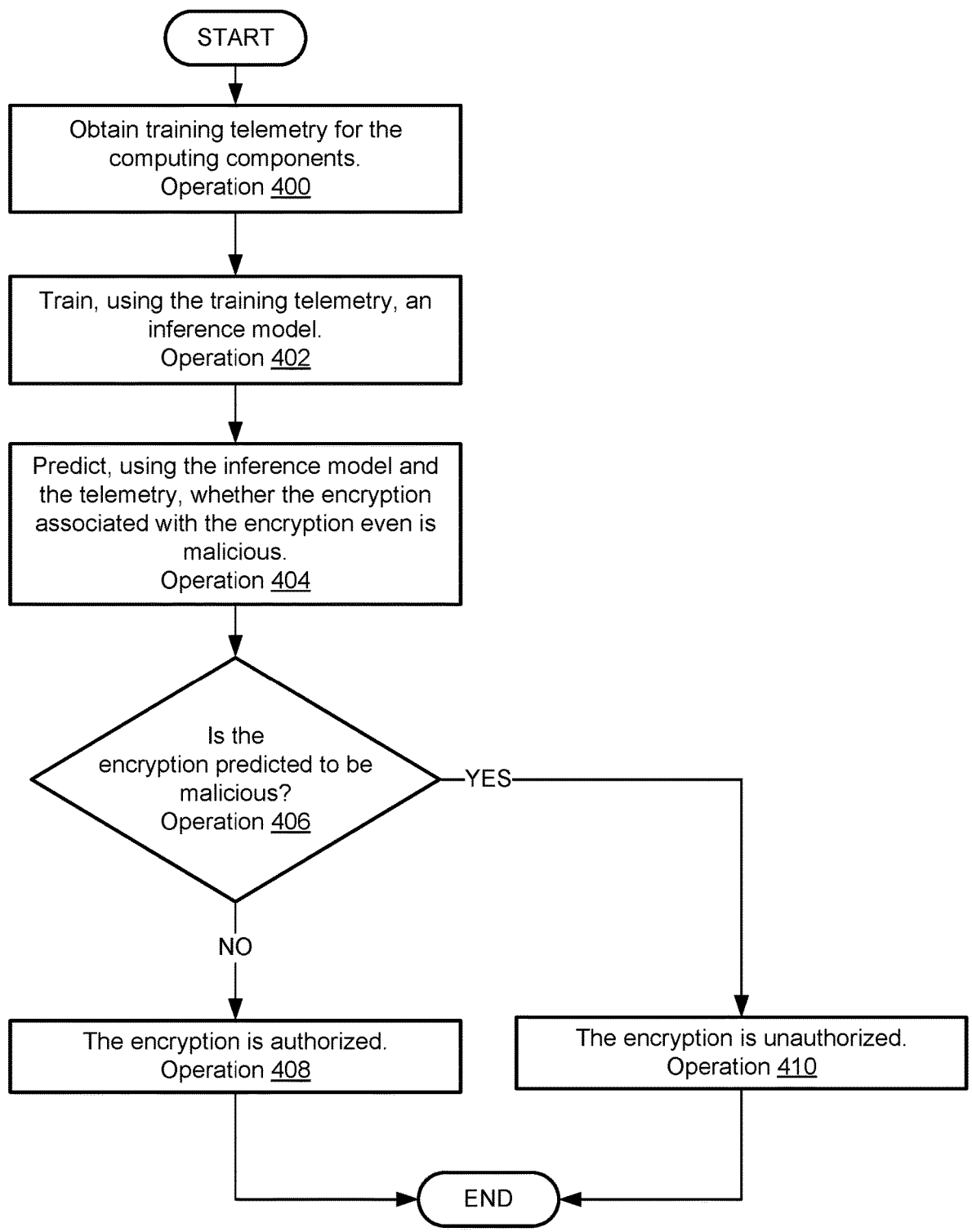
FIG. 4 shows a flow diagram illustrating a method of determining an authorization state for encryption in accordance with an embodiment.
Figure 5:
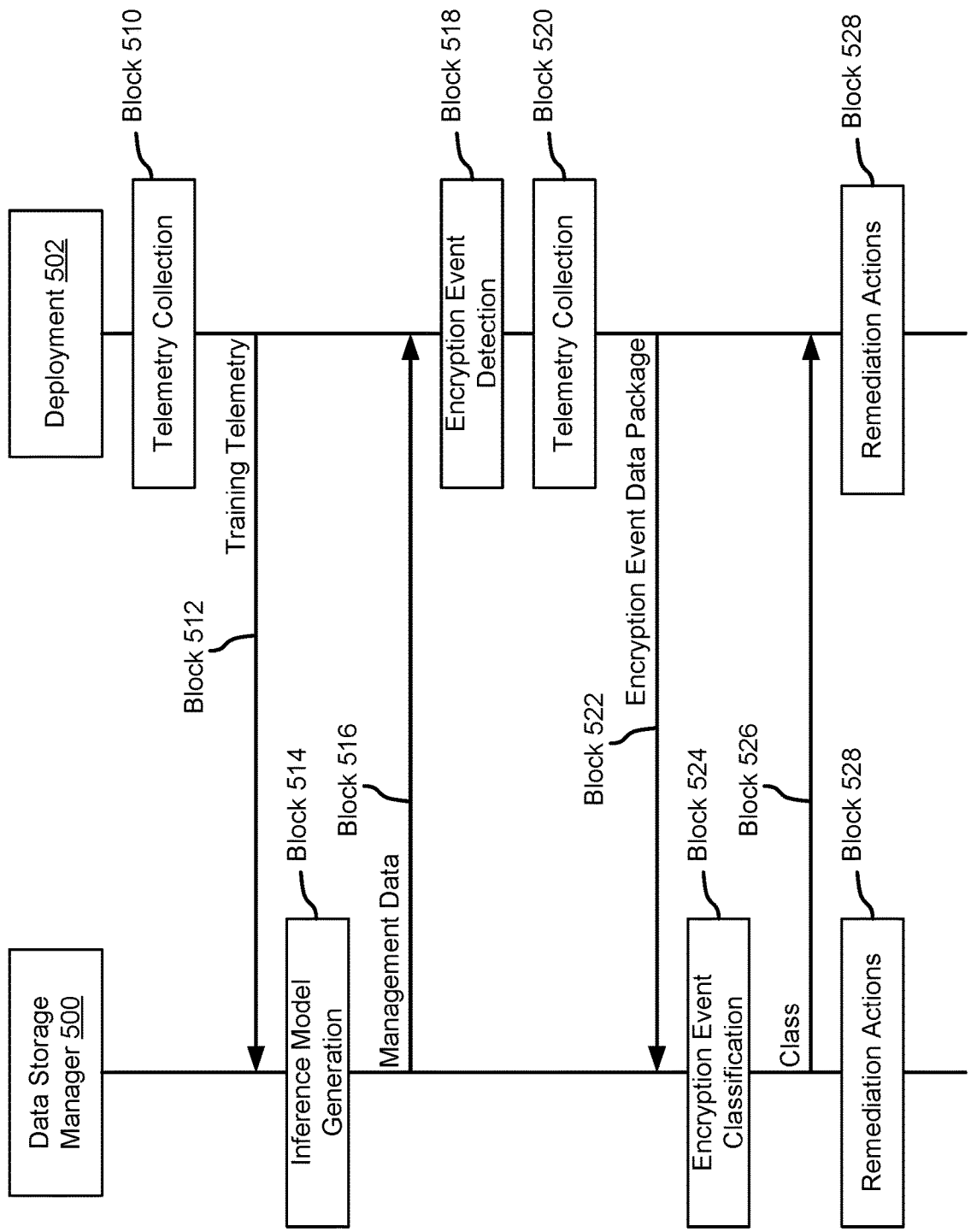
FIG. 5 shows a diagram illustrating blocks showing operation of a system over time in accordance with an embodiment.

While providing its functionality, any of storage manager 204, one or more of applications 206, and/or one or more of malicious applications 208 may perform all, or a portion, of the methods, operations, and actions illustrated in FIGS. 3-5.

In an embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 210 may store data structures including application data 212, tracing data 214, and/or management repository 216.

Application data 212 may be implemented using one or more data structures that include any type and quantity of data usable, stored by, and/or otherwise desired by applications 206. Application data 212 may include, for example, databases, repositories, lists, tables, and/or any other types of data structures storing any type and quantity of data.

Tracing data 214 may be implemented with one or more data structures that include telemetry data. The telemetry data may include live telemetry data (e.g., based on current operation of a data processing system, specifically, storage system and/or other components) and/or training telemetry.

Live telemetry may include any type and quantity of information regarding the current operation of storage 210, and/or other components. The information may include, for example, (i) lists of running processes, (ii) lists of files that have been modified and/or accessed, (iii) lists of files names (e.g., or other data structure types), (iv) information regarding input-output such as trace information regarding the operations performed by various physical storage devices of storage 210, (v) access and/or modification information regarding organizational metadata such as file structure in a file system, (vi) lists of instances of layered encryption (e.g., when a portion of data is encrypted, and then the encrypted data is encrypted a second time giving rise to a double layer of encryption for a data which may require multiple encryption keys to decrypt), and/or (vii) any other type of information regarding the operation of storage 210.

Training telemetry data may include similar to that of live telemetry data, but may be historic in nature (e.g., for past periods of time). The past periods of time may either be associated with malicious activities such as unauthorized encryption or non-malicious activities such as authorized encryption. Thus, the training telemetry data may be used to establish relationships between the occurrence of various actions by storage devices of storage 210 and corresponding activities (e.g., malicious or non-malicious). The training telemetry may include any quantity of such information thereby allowing any number of such telemetry-to-activity relationships to be established. These relationships may be used to obtain inference models usable to determine whether an encryption being performed is likely to be authorized or unauthorized (e.g., malicious).

Management repository 216 may be implemented with one or more data structures that include any quantity and type of information usable for discriminate unauthorized encryption activities from authorized encryption activities. For example, management repository 216 may include inference models that operate on live training telemetry data (e.g., from tracing data 214 or in-memory data structures).

While various data structures have been illustrated and described in FIG. 2A with specific structures, any of the data structures may be implemented with any type of structure (e.g., lists, tables, linked lists, databases, etc.), stored in different locations, and/or spanned across any number of devices without departing from embodiments disclosed herein. Further, any of these data structures may be combined with other types of data, or divided into any number of data structures to provide for separation at any level of granularity.

Any of data processing systems 202A-202N may perform similar or different functions from other data processing systems of deployment 200.

While illustrated in FIG. 2A with a limited number of specific components, a deployment may include additional, fewer, and/or different components without departing from embodiments disclosed herein.

Figure 2B:
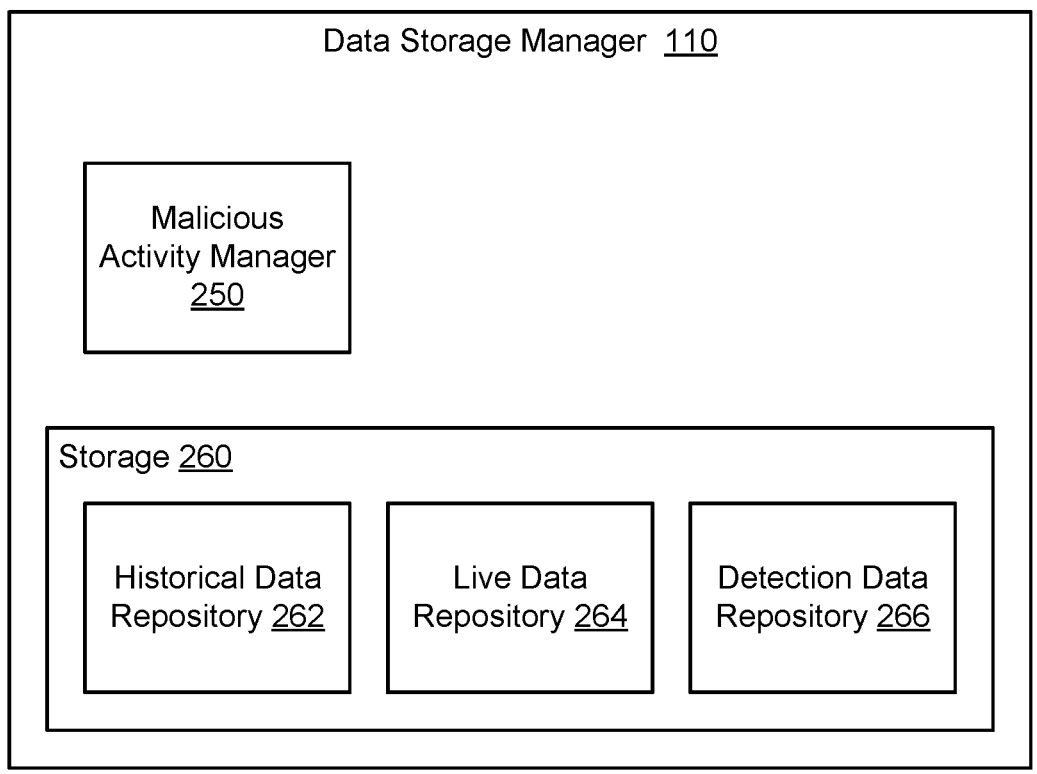
FIG. 2B shows a block diagram illustrating a data storage manager in accordance with an embodiment.

Turning to FIG. 2B, a diagram of data storage manager 110 in accordance with an embodiment is shown. To provide it functionality, data storage manager 110 may include malicious activity manager 250 and storage 260. Each of these components is discussed below.

Malicious activity manager 250 may provide malicious activity detection services. These services may include (i) obtaining telemetry (historic and/or live) from one or more storages (e.g., of data processing systems), (ii) obtaining information regarding encryptions being performed (e.g., associated with the telemetry) by the storages, (iii) obtaining inference models (e.g., stored in detection data repository 266) using historical data repository 262, (iv) deploying the inference models, (v) causing inferences to be generated by the inference models (e.g., using live data repository 264), (vii) causing authorization states for the encryptions to be generated with the inferences and/or information regarding the encryptions, and/or (viii) orchestrating remediation of risk when encryptions are determined as having unauthorized authorization states.

For example, malicious activity manager 250 may identify a type of the encryption and compare the identified type of encryption to a list of authorized encryption types (or characteristics of authorized encryption types). If not listed, then the encryption may be suspected of or may be treated as being unauthorized.

In another example, malicious activity manager 250 may use live telemetry as input to an inference model. The inference model may output a prediction regarding whether an encryption associated with the live telemetry is authorized. The malicious activity manager 250 may take into account both the prediction and the suspected authorization based on the encryption type in determine whether to treat the encryption as being authorized or unauthorized (e.g., malicious).

In an embodiment, malicious activity manager 250 is implemented using a hardware device including circuitry. The hardware device may be, for example, a digital signal processor, a field programmable gate array, or an application specific integrated circuit. The circuitry may be adapted to cause the hardware device to perform the functionality of malicious activity manager 250. Malicious activity manager 250 may be implemented using other types of hardware devices without departing embodiment disclosed herein.

In one embodiment, malicious activity manager 250 is implemented using a processor adapted to execute computing code stored on a persistent storage that when executed by the processor performs the functionality of malicious activity manager 250 discussed throughout this application. The processor may be a hardware processor including circuitry such as, for example, a central processing unit, a processing core, or a microcontroller. The processor may be other types of hardware devices for processing information without departing embodiment disclosed herein.

While providing its functionality, malicious activity manager 250 may perform all, or a portion, of the methods, operations, and actions illustrated in FIGS. 3-5.

In an embodiment, storage 260 is implemented using physical devices that provide data storage services (e.g., storing data and providing copies of previously stored data). The devices that provide data storage services may include hardware devices and/or logical devices. For example, storage 260 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 260 may include a memory device (e.g., a dual in line memory device) in which data is stored and from which copies of previously stored data are provided. In another example, storage 260 may include a persistent storage device (e.g., a solid-state disk drive) in which data is stored and from which copies of previously stored data is provided. In a still further example, storage 260 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 260 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 260 may store data structures including historical data repository 262, live data repository 264, and/or detection data repository 266.

Historical data repository 262 may be implemented with one or more data structures that include information regarding training telemetry data. Historical data repository 262 may include any quantity and type of information regarding training telemetry data, which may be obtained from any number of storage devices/storage of any number of data processing systems of any number of deployments.

Live data repository 264 may be implemented with one or more data structures that include information regarding live telemetry data. For example, live data repository 264 may include live telemetry from a data processing system to ascertain whether an encryption being performed on data hosted by the data processing system is authorized or unauthorized. Live data repository 264 may include such information from any number of data processing systems. Once outcomes with respect to the encryptions are known, the live telemetry and outcome may be used to add additional training telemetry to historical data repository 262 and may be removed from live data repository 264.

Detection data repository 266 may be implemented with one or more data structures that include information usable to ascertain whether an encryption is authorized. For example, detection data repository 266 may include lists of types of authorized encryptions (e.g., which may be data processing system specific) and inference models usable to predict (e.g., using live telemetry) whether an encryption activity is authorized.

The lists of types of authorized encryptions may include, for example, (i) block cipher types, (ii) block lengths, (iii) characteristics regarding encrypted data such as the entry of the encryption (e.g., whether patterns exist in the encrypted data and to what extent the patterns exist/repeat/etc.), (iv) recurrence levels in the encrypted data, (v) a specific encryption scheme, and/or (vi) other characteristics of the encryption being performed.

In an embodiment, the inference models are implemented with machine learning models. The machine learning models may be trained using all, or a portion, of the information in historical data repository 262. The machine learning models may implement any type of learning/prediction/inference algorithm. The trained machine learning models may take, as input, live telemetry and provide, as output, a prediction regarding whether an encryption associated with the live telemetry is authorized or unauthorized.

In an embodiment, the inference models are implemented with one or more thresholds corresponding to various portions and types of information included in telemetry. The thresholds may define limits that if exceeded indicate that an encryption associated with live telemetry is unauthorized. The threshold may be defined, for example, using statistical analysis of historical data repository 262 to identify typical behavior of a data processing system over time. The thresholds may be set such that anomalous behavior is detected when the operation of the data processing systems exceeds one or more of the thresholds.

For example, the thresholds may specify (i) a rate of data encryption, (ii) a load on a storage system (e.g., such as processing resources utilization, memory utilization, I/O utilization, network utilization, etc.), and/or (iii) other characteristics regarding the operation of a data processing system.

While various data structures have been illustrated and described in FIG. 2B with specific structures, any of the data structures may be implemented with any type of structure (e.g., lists, tables, linked lists, databases, etc.), stored in different locations, and/or spanned across any number of devices without departing from embodiments disclosed herein. Further, any of these data structures may be combined with other types of data, or divided into any number of data structures to provide for separation at any level of granularity.

While illustrated in FIG. 2B with a limited number of specific components, a data storage manager may include additional, fewer, and/or different components without departing from embodiments disclosed herein.

As discussed above, the components of FIG. 1 may perform various methods to increase the likelihood of clients being able to provide computer implemented services by proactively identifying and/or remediating deviations in the operation of data processing systems from nominal operation. Such deviations may be due to malicious activity.

FIGS. 3-4 illustrates examples of methods that may be performed by the components of FIG. 1. In the diagrams discussed below and shown in FIGS. 3-4, any of the operations may be repeated, performed in different orders, and/or performed in parallel with or a partially overlapping in time manner with other operations.

Turning to FIG. 3, a flow diagram illustrating a method of managing the operation of a data processing system according to an embodiment is shown. The method may be performed, for example, by the data processing system, components thereof, and/or a data storage manager.

Prior to operation 300, a detection data repository may be populated with information usable to detect unauthorized encryption events. The detection data repository may be populated using training telemetry to obtain any number of inference models and/or via heuristically obtained information such as lists of expected types of encryption and/or characteristics of the expected types of encryption. The detection data repository may be maintained by a data storage manager and/or one or more data processing systems. Information included in the detection data repository may be used to, for example, populate part of a management repository maintained by a data processing system usable by the data processing system to detect unauthorized encryption being performed on data stored in data storage devices of the data processing system. In some embodiments, the management repository may include information (e.g., telemetry for one or more storage devices such as hard disk drives, types of encryption being performed, etc.) to be provided to a data storage manager which may analyze the information to identify whether encryption is authorized or unauthorized (e.g., likely to be malicious in nature).

As part of the detection data repository population process, the data storage manager may present one or more graphical user interface (e.g., through a user device) to a manager or other person tasked with managing the operation of a deployment. The user may provide information regarding the expected operation of the deployment and/or components thereof. The data management system may utilize the aforementioned information to ascertain types and/or characteristics of encryption that are to be expected thereby allowing for such encryption to be discriminated from unauthorized encryption. The person may also select which deployments, or portions thereof, are to be monitored for unauthorized encryption. In this manner, a person may be provided with a seamless interface through which automated encryption monitoring and remediation may be deployed. Consequently, the cognitive burden on persons for managing deployments may be greatly reduced when compared to manual processes of configuring deployments which may require the person to have expert level knowledge regarding the operation of such deployments.

At operation 300, an encryption event is identified. The encryption event may be identified by a storage manager hosted by a data processing system. The storage manager may generally provide for mediate use of storage by various applications. An application hosted by the data processing system may have initiated encryption by sending various information regarding the actions to implement encryption to the storage manager. The storage manager may identify the encryption event based on these messages (and/or via messages from intermediary entities such as higher level management entities, operating systems, etc.).

At operation 302, a determination is made regarding whether encryption associated with the encryption event is an expected type of encryption. The determination may be made based on (i) the type of the encryption and/or (ii)

characteristics of the encryption being performed. For example, the messages that initiated performance of the encryption may include information regarding the type of encryption and the characteristics (e.g., cipher type, block length of the cipher, entropy level of portions of the encrypted data, recurrence level of the encryption, a scheme employed by the encryption, etc.) of the encryption and/or portions of data encryption via the encryption may also indicate characteristics of the encryption. The type and/or characteristics of the encryption may be compared to a list of encryption types/characteristics that are to be expected. If the type/characteristics of the encryption do not match entries of the list, then it may be determined that the encryption is unauthorized. Otherwise, the encryption may be determined to be authorized.

In an embodiment, the determination is made by the data processing system. In an embodiment, the determination is made by a data storage manager. For example, the data storage device may provide (e.g., via network communications or other communication methods) information regarding the type/characteristics of the encryption to the data storage manager which may make the determination and/or provide information regarding the outcome of the determination to the data processing system.

If it is determined that the encryption is authorized, then the method may proceed to operation 304 following operation 302. Otherwise, the method may proceed to operation 308 following operation 302.

At operation 304, telemetry from one or more computing components impacted by the encryption is collected. The one or more computing components may include one or more storage devices in which data is stored that is being encrypted as part of the encryption. The telemetry may include information regarding the operation of the storage devices during the encryption. The telemetry may include, for example, information regarding processes hosted by the storage devices, data structures (e.g., files) that have been changed, deleted, and/or added via the encryption, input-output (I/O) operations such as I/O traces, data access and/or modifications of organizational metadata such as that which may define directory structures, instances of double or types of multiple encryption (e.g., when already encrypted data is encrypted an additional time), and/or other types of information (e.g., processing load, memory utilization rate, communication bandwidth utilization rate, etc.).

In an embodiment, the telemetry is collected by reading it from one or more log files or other types of data structures generated by (or modified by or based on information from) the storage devices. In an embodiment, the telemetry is collected by instantiating or using an instantiated process hosted by the data storage devices that monitors and/or reports the activity of the storage devices. The process may do so through any mechanism (e.g., messaging, storing information in a data structure in a storage device, storing information in an in-memory data structure, etc.).

In an embodiment, operations 304-306 are performed while operation 302 is being performed.

For example, if it is determined, in operation 302, that the encryption is not an expected type of encryption, the determination may be treated as an indication that the encryption is unauthorized (as opposed to a conclusive outcome of the encryption being unauthorized). Likewise, the determination in operation 306, discussed below, may also be treated as an indication that the encryption is unauthorized. Thus, in an embodiment, operations 302, 304, and 306 are performed and used by operation 308 to ascertain whether and type of action set to perform to remediate risk associated with the encryption event.

In an embodiment, operations 304-306 are performed after operation 302 is performed. Doing so may limit computing resource expenditure (e.g., if the encryption is determined as being unauthorized in operation 302 and treated as being conclusive resulting in remediation being performed in operation 308).

At operation 306, a determination is made regarding whether the telemetry indicates that the encryption is authorized. The determination may be made using an inference model that operates on the telemetry (e.g., input) and provides a prediction regarding whether the encryption is authorized. The inference model may be based on training telemetry.

In an embodiment, multiple inference models are used to make the determination. For example, multiple inference models may be trained using different portions of training telemetry such that the respective inference models may be specialized for the detection of different type of unauthorized encryption. The output (e.g., predictions) of the multiple inference models may be used (e.g., statistically analyzed) to make the determination.

In an embodiment, one or more inference models are thresholds for one or more dimensions of the telemetry. For example, the telemetry may include multiple dimensions corresponding to different characteristics regarding the operation of a storage device (e.g., storing data being encrypted). The corresponding portion of the telemetry exceeding one or more of the thresholds may indicate that the encryption is not authorized. The thresholds may be set using training telemetry (e.g., by a data storage manager) which may be analyzed using any methodology to identify the thresholds.

In an embodiment, the thresholds are set to detect anomalies in the operation of the storage devices. Detection of an anomaly in the operation of a storage device during an encryption may be treated as indicating that the encryption is unauthorized.

In an embodiment, one or more inference models are trained machine learning models. The inference models may be implemented with other types of learning inference algorithms without departing from embodiments disclosed herein.

In an embodiment, one or more of the inference models are trained for anomaly detection. Consequently, detections of anomalies in the telemetry may be treated as detections of unauthorized encryption.

In an embodiment, the determination is made via the method illustrated in FIG. 4. The determination may be made via other methods without departing from embodiments disclosed herein.

If it is determined that the telemetry indicates that the encryption is authorized, then the method may end following operation 306. Ending after operation 306 may indicate that the encryption is authorized. Otherwise, the method may proceed to operation 308 following operation 306.

In operation 308, an action set is performed to remediate risk associated with the encryption event. The content of the actions set may be based on the outcome of one or both of the determinations made in operations 302 and 306.

In an embodiment, the action set includes one or more of the following actions: (i) suspending performance of the encryption, (ii) reverting operations performed as part of the encryption, (iii) notifying an administrator or other person (e.g., by notifying a data storage manager which may present such information to the person via an interface, electronic communication, or other means), (iv) generating training telemetry using the telemetry and/or providing the generated training telemetry to a data storage manager, and/or (v) any other actions that may be used to reduce the likelihood of the data processing system being unable to perform one or more computer implemented services due to the encryption.

In an embodiment, the determinations of operations 302 and 306 are keyed to various entries of a data structure. The entries may define, indicate, or otherwise allow for the actions of the action set to be determined. The data structure may be maintained by, for example, an administrator or other person. The data structure may be implemented with a lookup table that uses the determinations as keys. The lookup data structure may also use other information (e.g., encryption type) as keys to identify the actions.

The method may end following operation 308.

Turning to FIG. 4, a flow diagram illustrating a method of processing telemetry according to an embodiment is shown. The method may be performed, for example, by the data processing system, components thereof, and/or a data storage manager.

At operation 400, training telemetry is obtained. The training telemetry may be for one or more computing components (e.g., storage devices) which were subject to unauthorized encryption. The training telemetry may include various portions corresponding to any number of storage devices. The training telemetry may be obtained similarly to that discussed with respect to steps 306-308 of FIG. 3.

In an embodiment, the training telemetry is obtained from a data processing system. The data processing system may monitor its data storage devices to generate the training telemetry. The training telemetry may then be provided to a data storage manager.

At operation 402, an inference model is trained using the training telemetry. In an embodiment, training the inference models includes (i) identifying one or more thresholds indicating anomalous operation and/or (ii) training a predictive model such as a machine learning model using the training telemetry. The trained inference model may be stored in a data storage system and/or distributed to data processing devices managed by the data storage system.

At operation 404, the inference model and the telemetry (e.g., via operation 306) may be used to predict whether the encryption associated with an encryption event is malicious. The inference model may be driven with the telemetry (e.g., used as input, or a basis for comparison) to generate the prediction. For example, predictions of anomalous operation via the inference models may be treated as predictions of the encryption being malicious.

At operation 406, it is determined whether the encryption is predicted as being malicious. If predicted (e.g., in operation 4040) as being malicious, then the method may proceed to operation 410. Otherwise the method may proceed to operation 408 following operation 406.

At operation 408, the encryption is treated as being authorized (e.g., causing the yes-path to followed following operation 306).

The method may end following operation 408.

Returning to operation 406, the method may proceed to operation 410 following operation 406 when the encryption is predicted to be malicious.

At operation 410, the encryption is treated as being unauthorized (e.g., causing the no-path to be followed following operation 306).

The method may end following operation 410.

In an embodiment, operations 400 and 402 are performed prior to operation 300 while operations 404-410 are performed after operation 300.

To further clarify embodiments disclosed herein, an action diagram in accordance with an embodiment is shown in FIG. 5. The diagram illustrates actions and interactions that may be performed by various components shown in FIG. 1. In FIG. 5, blocks lower on the page generally indicate actions, functions, etc. performed after actions higher on the page. However, the functions, actions, etc. indicated in each block may be performed in other orders and/or entirely or partially concurrently with other blocks. Lines terminating in arrows between the lines descending from the blocks with "data storage manager" and "deployment" indicate communications between the data storage manager 500 and deployment 502 whereas the blocks overlaying the descending line indicate actions, functions, etc. substantially performed by the entity from which the line descends. Like names components in FIGS. 1 and 5 may be similar.

As seen in block 510, deployment 502 may perform telemetry collection. The telemetry collection may be performed while an encryption is not ongoing to identify baseline operating characteristics of a storage device hosted by a data processing system of deployment 502.

At block 512, training telemetry, based on the telemetry collection, may be provided to data storage manager 500. At block 514, data storage manager 500 may perform inference model generation using the training telemetry. In this manner, an inference model capable of detecting anomalous operation of the storage device may be obtained.

After the inference model is obtained, at block 516, management data may be provided to deployment 502. The management data may include information usable by deployment 502 to appropriately collect telemetry for use by the inference model and/or so that deployment 502 is able to identify types of encryption and/or characteristics of encryptions that indicate that the encryption is authorized.

At block 518, an encryption even detection is performed by deployment 502. In response to the encryption event detection, at block 520, deployment 502 performs telemetry collection. The telemetry collection may be based on the management data. For example, the telemetry collection may include collecting information regarding the encryption and collecting information regarding the operation of a storage device which stores data on which the encryption is being performed.

Based on the telemetry collection, at block 522, deployment 502 prepares and sends an encryption event data package to data storage manager 500. The data package may include or may be based on information obtained via telemetry collection.

In response to obtaining the data package, at block 524, data storage manager 500 performs encryption event classification. The encryption event classification may result in the encryption being classified as authorized or unauthorized. For the purposes of this example, in block 524, the encryption is classified as being unauthorized.

At block 526, data storage manager 500 provides a class of the encryption to deployment 502. In this example, the class is unauthorized.

At block 528 and based on the encryption being classified as unauthorized, data storage manager 500 and/or deployment 502 perform one or more remedial actions to mitigate risk associated with the unauthorized encryption. For example, the process performing the encryption may be suspended from execution, changes (e.g., encryption) to data by the process may be reverted, etc.

Thus, as illustrated in FIG. 5, embodiments disclosed herein may facilitate proactive identification and/or remediation of unauthorized encryption. Consequently, the impact of malicious activity on a system may be reduced by limiting the potential scope of such malicious activities. Accordingly, a system in accordance with embodiments disclosed herein may provide a higher uptime, more responsive computer implemented services, and may incur reduced computational overhead for remediating malicious activities.

Any of the components illustrated in FIGS. 1-5 may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include 10 devices such as devices (e.g., 605, 606, 607, 608) including network interface device(s) 605, optional input device(s) 606, and other optional 10 device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method performed by a data storage manager that manages malicious activity in a data processing system, the method comprising:

identifying an encryption event associated with a storage of the data processing system, the encryption event being associated with a change in encryption state of a portion of data stored in the storage and is reported to the data storage manager by a storage manager installed within the data processing system in response to the storage manager receiving one or more encryption instructions to encrypt data stored in the storage, the storage manager managing the storage and the data;

performing type classification for an encryption associated with the encryption event;

making a first determination, using the type classification, that the encryption event is authorized;

after the first determination, collecting telemetry of one or more computing components of the data processing system that are impacted by the encryption, the telemetry comprises at least a list of input-output (I/O) operations of the storage leading up to and during the encryption event, and the encryption event being identified without using the telemetry;

making a second determination, after collecting the telemetry and based on the telemetry, that the encryption is actually not authorized; and performing, based on the second determination that the encryption is actually not authorized, an action set to remediate risk associated with the encryption event, the action set being based, at least in part, on outcomes of the first determination and of the second determination.

2. The computer-implemented method of claim 1, wherein making the first determination comprises:

comparing the type classification to a list of allowed type classifications;

when the type classification matches an entry of the list of allowed type classifications, making the first determination that the encryption is authorized; and when the type classification does not match any entry of the list of allowed type classifications: making a third determination, instead of the first determination that the encryption is not authorized and skipping the collection of the telemetry and the second determination to initiate performance of the action set to remediate the risk associated with the encryption event.

3. The computer-implemented method of claim 2, wherein making the second determination comprises:

using the telemetry as input to an inference model, the inference model outputting a prediction regarding whether the encryption is authorized based on the input;

when the prediction indicates that the encryption is authorized, making a fourth determination, instead of the second determination, that the encryption is authorized; and when the prediction indicates that the encryption is not authorized, making the second determination that the encryption is not authorized.

4. The computer-implemented method of claim 1, wherein making the second determination comprises:

driving an inference model with the telemetry to obtain a prediction of whether the encryption is authorized, wherein the inference model is based on training telemetry obtained from the one or more computing components prior to when the telemetry is obtained.

5. The computer-implemented method of claim 4, wherein the inference model is an anomaly detection model.

6. The computer-implemented method of claim 4, wherein the training telemetry comprises first information regarding operation of a storage system of the data processing system that comprises at least the storage and the storage manager during a second encryption event that is associated with a second encryption that is known to be unauthorized.

7. The computer-implemented method of claim 4, wherein the training telemetry comprises second information regarding operation of a storage system of the data processing system that comprises at least the storage and the storage manager during a third encryption event that is associated with a third encryption that is known to be authorized.

8. The computer-implemented method of claim 4, wherein the inference model comprises a number of thresholds, each of the number of thresholds indicating that the encryption is not authorized when the telemetry exceeds at least one of the number of thresholds.

9. The computer-implemented method of claim 1, wherein the telemetry further comprises:

a list of processes hosted by the data processing system;

a list of data structures that are hosted by the data processing system and have been accessed as part of the encryption;

a list of names of the data structures;

a list of accesses of organizational data structures that organize data stored by the data processing system while the encryption is ongoing; and a list of any multi-encryption events while the encryption is ongoing.

10. The computer-implemented method of claim 1, wherein the telemetry is used to identify an encryption characteristic of the encryption associated with the encryption event, the encryption characteristic comprising a level of recurrence of the encryption on a data structure on which the encryption is being applied.

11. The computer-implemented method of claim 1, wherein the action set comprises:

suspending execution of an entity associated with the encryption; and reverting one or more changes to application data hosted by the data processing system.

12. The method of claim 1, wherein the telemetry is collected from the one or more computing components being impacted by the encryption and analyzed by the data processing system only after the encryption event has been identified, and the encryption event is identified by the data processing system solely based on the storage manager receiving the one or more encryption instructions.

13. The method of claim 12, wherein the telemetry is used to identify encryption characteristics of the encryption associated with the encryption event, the encryption characteristics comprising a block length used by the encryption and a level of entropy of output of the encryption.

14. The method of claim 12, wherein the telemetry is used to identify encryption characteristics of the encryption associated with the encryption event, the encryption characteristics comprising a block cipher used by the encryption and a level of entropy of output of the encryption.

15. A non-transitory machine-readable medium having instructions stored therein, which when executed by a processor of a data storage manager, cause the processor to perform operations to manage malicious activity in a data processing system, the operations comprising:

identifying an encryption event associated with a storage of the data processing system, the encryption event being associated with a change in encryption state of a portion of data stored in the storage and is reported to the data storage manager by a storage manager installed within the data processing system in response to the storage manager receiving one or more encryption instructions to encrypt data stored in the storage, the storage manager managing the storage and the data;

performing type classification for an encryption associated with the encryption event;

making a first determination, using the type classification, that the encryption event is authorized;

after the first determination, collecting telemetry of one or more computing components of the data processing system that are impacted by the encryption, the telemetry comprises at least a list of input-output (I/O) operations of the storage leading up to and during the encryption event, and the encryption event being identified without using the telemetry;

making a second determination, after collecting the telemetry and based on the telemetry, that the encryption is actually not authorized; and performing, based on the second determination that the encryption is actually not authorized, an action set to remediate risk associated with the encryption event, the action set being based, at least in part, on outcomes of the first determination and of the second determination.

16. The non-transitory machine-readable medium of claim 15, wherein making the first determination comprises:

comparing the type classification to a list of allowed type classifications;

when the type classification matches an entry of the list of allowed type classifications, making the first determination that the encryption is authorized; and when the type classification does not match any entry of the list of allowed type classifications: making a third determination, instead of the first determination that the encryption is not authorized and skipping the collection of the telemetry and the second determination to initiate performance of the action set to remediate the risk associated with the encryption event.

17. The non-transitory machine-readable medium of claim 16, wherein making the second determination comprises:

using the telemetry as input to an inference model, the inference model outputting a prediction regarding whether the encryption is authorized based on the input;

when the prediction indicates that the encryption is authorized, making a fourth determination, instead of the second determination, that the encryption is authorized; and when the prediction indicates that the encryption is not authorized, making the second determination that the encryption is not authorized.

18. A data storage manager, comprising:

a processor; and a memory coupled to the processor to store instructions, which when executed by the processor, cause the processor to perform operations for managing malicious activity in a data processing system, the operations comprising:

identifying an encryption event associated with a storage of the data processing system, the encryption event being associated with a change in encryption state of a portion of data stored in the storage and is reported to the data storage manager by a storage manager installed within the data processing system in response to the storage manager receiving one or more encryption instructions to encrypt data stored in the storage, the storage manager managing the storage and the data;

performing type classification for an encryption associated with the encryption event;

making a first determination, using the type classification, that the encryption event is authorized;

after the first determination, collecting telemetry of one or more computing components of the data processing system that are impacted by the encryption, the telemetry comprises at least a list of input-output (I/O) operations of the storage leading up to and during the encryption event, and the encryption event being identified without using the telemetry;

making a second determination, after collecting the telemetry and based on the telemetry, that the encryption is actually not authorized based on the type classification and/or the telemetry; and performing, based on the second determination that the encryption is actually not authorized, an action set to remediate risk associated with the encryption event, the action set being based, at least in part, on outcomes of the first determination and of the second determination.

19. The data storage manager of claim 18, wherein making the first determination comprises:

comparing the type classification to a list of allowed type classifications;

when the type classification matches an entry of the list of allowed type classifications, making the first determination that the encryption is authorized; and when the type classification does not match any entry of the list of allowed type classifications: making a third determination, instead of the first determination that the encryption is not authorized and skipping the collection of the telemetry and the second determination to initiate performance of the action set to remediate the risk associated with the encryption event.

20. The data storage manager of claim 19, wherein making the second determination comprises:

using the telemetry as input to an inference model, the inference model outputting a prediction regarding whether the encryption is authorized based on the input;

when the prediction indicates that the encryption is authorized, making a fourth determination, instead of the second determination, that the encryption is authorized; and when the prediction indicates that the encryption is not authorized, making the second determination that the encryption is not authorized.

* * * * *